Dec. 1, 1953 A. VAN DUYN 2,661,202
OVER AND UNDERWEIGHT SCALE
Filed March 22, 1951 2 Sheets-Sheet 1

INVENTOR:
ADRIANUS VAN DUYN
BY
Spencer, Johnston, Cook & Root
ATT'YS

Dec. 1, 1953   A. VAN DUYN   2,661,202
OVER AND UNDERWEIGHT SCALE
Filed March 22, 1951   2 Sheets-Sheet 2
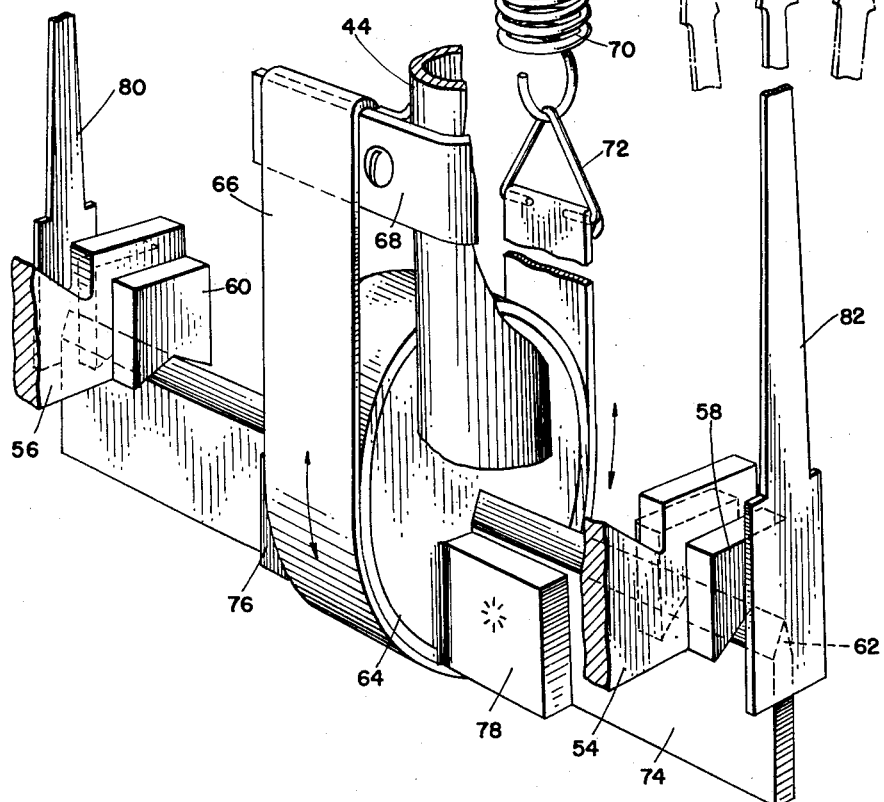
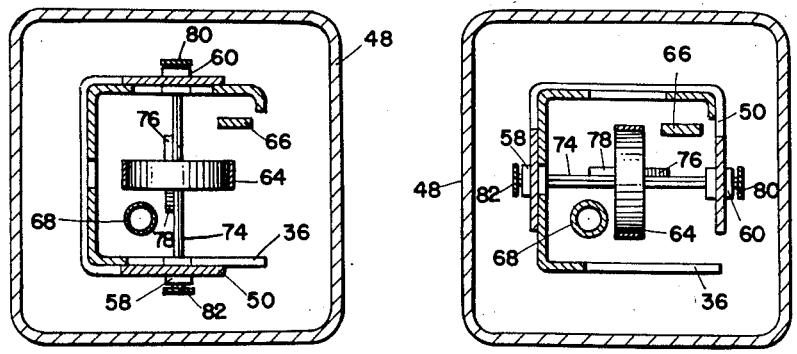
INVENTOR:
ADRIANUS VAN DUYN
BY
Spencer, Johnston, Cook & Root
ATT'YS Patented Dec. 1, 1953

2,661,202

UNITED STATES PATENT OFFICE 2,661,202

OVER AND UNDERWEIGHT SCALE

Adrianus van Duyn, Hillegersberg, Rotterdam, Netherlands, assignor to U. S. Slicing Machine Company, Inc., La Porte, Ind., a corporation of Indiana Application March 22, 1951, Serial No. 216,898

Claims priority, application Great Britain November 14, 1950

13 Claims. (Cl. 265—58)

1

This invention relates to a scale of the over- and underweight type and more particularly to a scale of the type having a centrally pivoted weigh beam.

It is an object of the invention to provide a scale which is compact in size and requires a minimum counter space and which is readily viewable from more than one side of the scale.

Another object of the invention is to provide a scale in which the weight indicating mechanism and the counterpoise platter are located in vertical alignment within an upstanding casing.

Another object of the invention is to provide a scale in which the weight indicating mechanism may be transversely shifted to positions at 90° angles with respect to each other.

A further object of the invention is to provide a scale in which the weight indicating mechanism is contained in a hollow upstanding column at the top of which is located the counterpoise weight receiver.

Still another object of the invention is to provide a scale in which the counterpoise receiver is located at the top of a hollow column and is enclosed with a transparent hood through which the counterpoise weight is visible.

These and other objects and advantages of the invention will become more apparent from a consideration of the following disclosure taken in conjunction with the drawings in which:

Figure 2 is a perspective view of a portion of the weight indicating mechanism of the scale;

Figure 3 is a sectional view taken along the lines 3—3 of Figure 1; and

Figure 4 is a sectional view generally similar to Figure 3 but having the weight indicating mechanism shifted transversely at a 90° angle with that of Figure 3.

Figure 1:
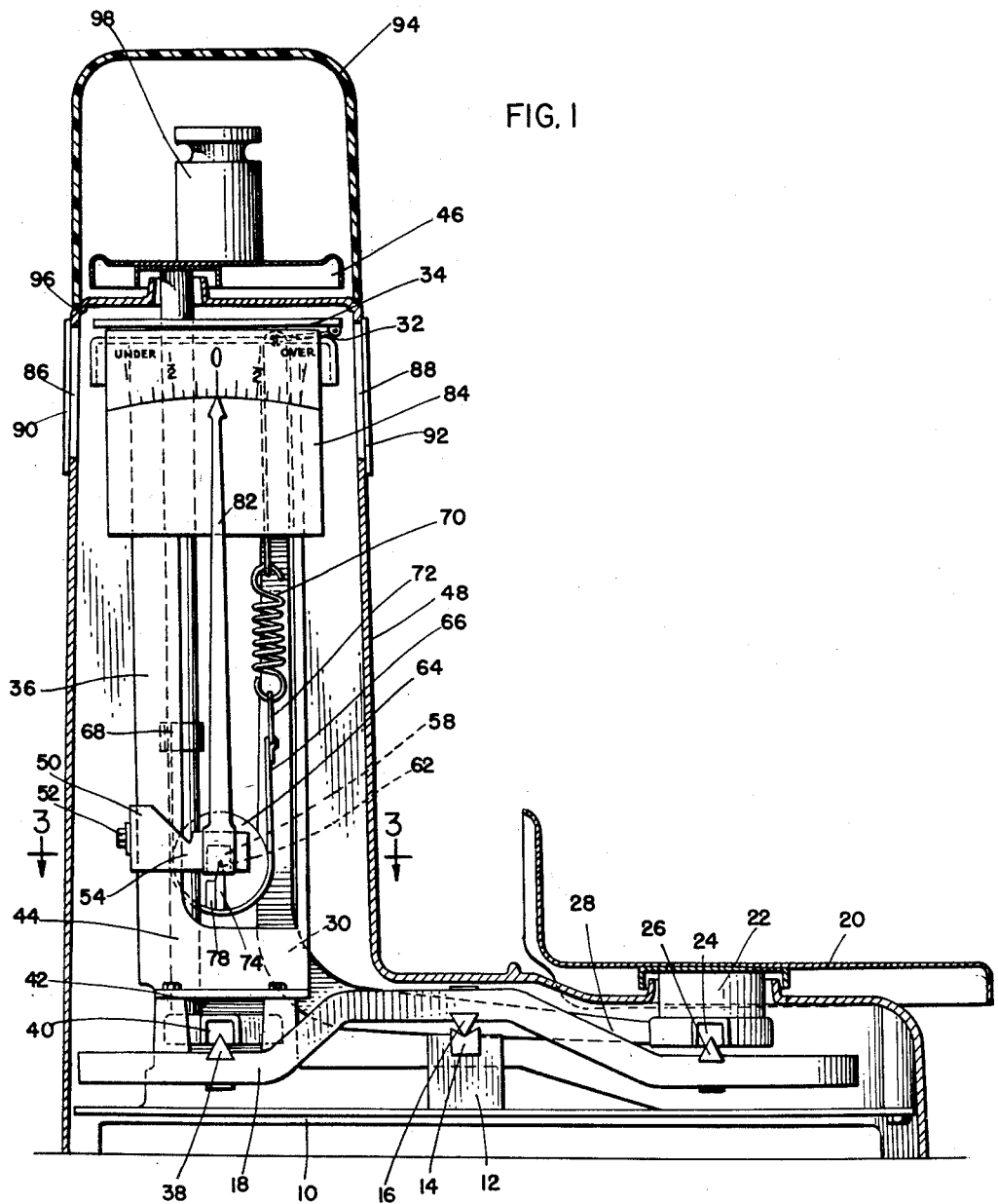
Figure 1 is a sectional view through one embodiment of a scale according to the invention.

The invention resides in a scale, of the type having a centrally pivoted weigh beam and an over- and underweight type indicating means, which is compact in size and requires a minimum of counter space. These features are accomplished by providing an upstanding casing located above one end of the weigh beam and containing the weight indicating means in vertical alignment with the counterpoise weights receiver. The weight indicating means is located within the upstanding body of the casing, while the counterpoise weights receiver is located at the top of the casing in a manner which renders the weights on the counterpoise receiver readily visible to the viewing public.

2

The invention further contemplates the provision of a plurality of weight indicating pointers in conjunction with a plurality of charts mounted at opposite sides of the upstanding column. The weight indicating mechanism is adapted for simple adjustment within the column to a position 90° removed from the original position. In this manner the scale may be adjusted for viewing from four different directions.

In Figure 1 of the drawings a scale of the selected type is illustrated as comprising a base 10 upon which is mounted a fulcrum block 12. A fulcrum bearing 14 is positioned on the block 12 and is adapted to pivotally receive the fulcrum pivot 16 which is attached to the weigh beam 18. The horizontal weigh beam 18 supports a commodity platter 20 at one end thereof on the platter support 22 which is adapted to receive the commodity supporting bearing 24 which in turn rests upon the commodity supporting pivot 26. The bar 28 is associated with the platter support 22 and is curved upwardly into the L-shaped arm 30 which is secured at its end to a check link 32 which in turn is pivotally connected to the top 34 of the supporting column 36. This linkage arrangement permits parallel movement of the commodity platter to be maintained.

The supporting column 36 is mounted on the base 10 adjacent one end thereof and extends upwardly at right angles thereto. The counterpoise end of the weigh beam 18 comprises a counterpoise pivot 38 which supports a counterpoise bearing 40 which is associated with a counterpoise support 42. The support 42 has a vertically positioned rod 44 attached thereto and the rod 44 extends vertically within the column 36 through the top 34 thereof and supports a counterpoise weights receiver 46 thereon. The receiver 46 is located outside and above the scale casing 48 which is substantially L-shaped and encloses the column 36 with all of the mechanism contained thereon and the weigh beam mechanism supported on the base 10. The casing 48 is preferably a single piece and is adapted to be readily removed from the scale to expose the mechanism for adjustment and cleaning.

The upstanding column 36 has a U-shaped bracket 50 removably secured thereto by means of the bolt 52. The bracket 50 fits around the column 36 and has a pair of outwardly extending arms 54 and 56 upon which are positioned a pair of bearing blocks 58 and 60. The bearing blocks are adapted to receive the pivot edge 62. The cylinder 64 is urged upwardly by means of the metal strap 66 which extends around the periphery of the cylinder and is adjustably secured at one end to the rod 44 by means of the clamp 68. The other end of the strap or ribbon 66 is secured to the lower end of a load counter-balancing spring 70 by means of the stirrup 72. The spring is anchored at its upper end to the rectangular top 24 of the column 36.

The pivot edge 62 is an integral part of a cross piece 74 which is attached to the inner periphery of the cylinder 64 by means of the laterally extending lugs 76 and 78 (Fig. 2). A pair of oppositely disposed pointers 80 and 82 are secured to the ends of the cross piece 74 and are adapted to cooperate with a pair of corresponding charts, one of which 84 is illustrated in Figure 1.

In order that the charts and pointers may be viewed from without, the casing 48 is provided with a plurality of viewing windows 86 and 88. A similar pair of opposite windows (not shown) may be located in the sides of the casing 48 transverse to the windows 86 and 88. If desired, a pair of removable shutters 90 and 92 may be provided in order to cover the opposite windows which are not in use.

A removable cap or dome 94 of transparent plastic, glass or other suitable transparent material rests on the top of the casing 48 on a shoulder 96. The cap 94 covers the weights receiver 46 and any counterpoise weights 98 which may be placed thereon. In this arrangement the viewing public may see the counterpoise weight at all times and from every position. At the same time the weight is easily accessible for changing by the operator. A further advantage of this arrangement is that the weight 98 is removed from the working area and is not likely to be contaminated with the commodity or to hamper the movements of the operator.

By removing the bolt 52 from the U-bracket 50 and attaching it to the column 36 at right angles to its original position as illustrated in Figure 4, it is possible to shift the position of the weight indicating mechanism to facilitate viewing of the charts from a different angle. Corresponding adjustments to the charts and the load counterbalancing are readily made by removing the casing 48 from about the column 36. The weight indications then become viewable through the other pair of opposite windows on removal of the shutters. Readings may be made from the front and rear or from the sides, as desired, having regard to the availability of counter space.

In the operation of the scale illustrated herein the operator will place a counterpoise weight 98 on the receiver 46. The cap 94 will be replaced so that the viewing public may see the weight at all times from any position. The rod 44 will be shifted vertically downward and will cause the counterpoise end of the weigh beam 18 to be depressed. A commodity will then be placed on the platter 20 in sufficient amount to cause the commodity end of the weigh beam 18 to be depressed by an amount sufficient to bring the two ends of the weigh beam into counter-balance. The shifting of the rod 44 upwardly and downwardly moves the strap 66 along the periphery of the cylinder 64 thereby rotating the cylinder about its pivotal axis a given amount. Since the pointers 80 and 82 are operatively associated with the cylinder 64, they will be swung by a corresponding amount.

From the foregoing description of the new over- and underweight scale it will be apparent that the invention provides a scale which is compact in size and readily adaptable to a small counter space. The new scale is characterized by an arrangement of parts which renders the weight mechanism clearly visible to the viewing public from all angles. In addition the invention provides a scale of the centrally pivoted weigh beam type which is novel, compact and which has the weight indicating mechanism and the counterpoise weights located in vertical alignment with the indicating means positioned below the counterpoise weights.

The invention is hereby claimed as follows:

1. Weighing apparatus of the over- and underweight type comprising a frame, a centrally pivoted weigh beam, commodity receiving means adjacent one end of said beam, weight indicating means including a pointer and chart adjacent the opposite end of said beam, and counterpoise receiving means vertically aligned above said weight indicating means.

2. Weighing apparatus of the over- and underweight type comprising a frame, a centrally pivoted weigh beam, commodity receiving means adjacent one end of said beam, weight indicating means including a pointer and chart adjacent the opposite end of said beam, counterpoise receiving means vertically aligned above said weight indicating means, and a vertically shiftable rod supporting said counterpoise receiving means at the upper end thereof and connected with said beam.

3. Weighing apparatus of the over- and underweight type comprising a frame, a centrally pivoted weigh beam, commodity receiving means adjacent one end of said beam, vertically aligned weight indicating means and counterpoise receiving means adjacent the opposite end of said beam, said weight indicating means including a vertically shiftable rod between said counterpoise receiving means and said beam, a strap supported rotatable cylinder, means for supporting said strap for relative movement with said rod, a cross-piece axially associated with said cylinder, bearing and pivot means operatively associated with said cross-piece and adapted for maintaining axial rotation thereof, pointers positioned at the ends of said cross-piece for rotation therewith, and chart means cooperatively positioned adjacent the ends of said pointers.

4. Weighing apparatus of the over- and underweight type comprising a frame, a centrally pivoted weigh beam, commodity receiving means adjacent one end of said beam, vertically aligned weight indicating means and counterpoise receiving means adjacent the opposite end of said beam, said weight indicating means including a vertically shiftable rod between said counterpoise receiving means and said beam, a flexible strap secured intermediate the ends of said rod and embracing the periphery of a rotatable cylinder, the opposite end of said strap being yieldably secured to said frame, a pair of frame supported inverted bearings, a cross-piece extending axially through said cylinder and having a pair of knife-edge pivots adapted to engage said bearings, pointers positioned at the ends of said cross-piece, and charts cooperatively positioned adjacent the ends of said pointers.

5. Weighing apparatus of the over- and underweight type comprising a substantially L-shaped frame having a horizontal base portion and a vertically upstanding column portion, a centrally pivoted weigh beam, a commodity receiving platter adjacent one end of said beam, weight indicating means including a pointer and chart adjacent the opposite end of said beam and contained within said column, and counterpoise receiving means vertically aligned above said weight indicating means and said column.

6. Weighing apparatus of the over- and underweight type comprising a substantially L-shaped frame having a horizontal base portion and a vertically upstanding column portion, a centrally pivoted weigh beam, a commodity receiving platter adjacent one end of said beam, weight indicating means adjacent the opposite end of said beam and contained within said column, counterpoise receiving means vertically aligned above said weight indicating means and said column, and a vertically shiftable rod supporting said counterpoise receiving means at its upper end and connected with said beam.

7. Weighing apparatus of the over- and underweight type comprising a substantially L-shaped frame having a horizontal base portion and a vertically upstanding column portion, a centrally pivoted weigh beam, a commodity receiving platter adjacent one end of said beam, weight indicating means adjacent the opposite end of said beam and contained within said column, counterpoise receiving means vertically aligned above said indicating means and said column, a unitary casing comprising a base enclosing portion and a column enclosing portion, and a plurality of opposed viewing openings in said casing adjacent the upper end thereof.

8. Weighing apparatus of the over- and underweight type comprising a substantially L-shaped frame having a horizontal base portion and a vertically upstanding column portion, a centrally pivoted weigh beam, a commodity receiving platter adjacent one end of said beam, weight indicating means adjacent the opposite end of said beam and contained within said column, counterpoise receiving means vertically aligned above said indicating means and said column, a unitary casing comprising a base enclosing portion and a column enclosing portion, a plurality of opposed viewing openings in said casing adjacent the upper end thereof, and a transparent cover supported on said casing surrounding the top and sides of said counterpoise receiving means.

9. Weighing apparatus of the over- and underweight type comprising a substantially L-shaped frame having a horizontal base portion and a vertically upstanding column portion, a centrally pivoted weigh beam, a commodity receiving platter adjacent one end of said beam, weight indicating means adjacent the opposite end of said beam and contained within said column, counterpoise receiving means vertically aligned above said indicating means and said column, a unitary casing comprising a base enclosing portion and a column enclosing portion, a plurality of opposed veiwing windows in said casing adjacent the upper end thereof, and a plurality of removable shutters for covering said windows.

10. Weighing apparatus of the over- and underweight type comprising a substantially L-shaped frame having a horizontal base portion and a vertically upstanding column portion, a centrally pivoted weigh beam, a commodity receiving platter adjacent one end of said beam, weight indicating means adjacent the opposite end of said beam and contained within said column, counterpoise receiving means vertically aligned above said indicating means and said column, and a unitary casing comprising a base enclosing portion, a column enclosing portion, and a plurality of opposed viewing windows in said casing adjacent the upper end thereof, said base portion having an auxiliary counterpoise weights storage platform between said platter and said column.

11. Weighing apparatus of the over- and underweight type comprising a frame, a centrally pivoted weigh beam, commodity receiving means adjacent one end of said beam, and vertically aligned weight indicating means and counterpoise receiving means adjacent the opposite end thereof, said weight indicating means including a pointer and chart shiftable on said frame in a horizontal plane to positions at right angles with the original position thereof.

12. Weighing apparatus of the over- and underweight type comprising a frame having a horizontal base portion and a vertically upstanding column portion, a centrally pivoted weigh beam, a commodity receiving platter adjacent one end of said beam, weight indicating means adjacent the opposite end of said beam and contained within said column, counterpoise receiving means vertically aligned above said indicating means and said column, a casing enclosing said column, and a plurality of opposed viewing openings in said casing adjacent the upper end thereof.

13. Weighing apparatus of the over- and underweight type comprising a frame having a horizontal base portion and a vertically upstanding column portion, a centrally pivoted weigh beam, a commodity receiving platter adjacent one end of said beam, said indicating means adjacent the opposite end of said beam and contained within said column, counterpoise receiving means vertically aligned above said indicating means and said column, a casing enclosing said column, a plurality of opposed viewing openings in said casing adjacent the upper end thereof, and a plurality of removable shutters for covering said openings.

ADRIANUS van DUYN.

References Cited in the file of this patent

UNITED STATES PATENTS

| Number | Name | Date |
| --- | --- | --- |
| 363,468 | Kent | May 24, 1887 |
| 906,960 | Swihart | Dec. 15, 1908 |
| 1,084,886 | Katterheinrich | Jan. 20, 1914 |
| 2,071,442 | Waltz | Feb. 23, 1937 |
| 2,297,141 | Gattoni | Sept. 29, 1942 |
| 2,316,947 | Flanagan | Apr. 20, 1943 |
| 2,622,867 | Williams | Dec. 23, 1952 |